March 2, 1965 A. W. HAIGH 3,171,497
LAWN EDGE CUTTER
Filed Sept. 27, 1963 3 Sheets-Sheet 1

INVENTOR
ARTHUR WILLIAM HAIGH
By Linton and Linton
ATTORNEYS

March 2, 1965 A. W. HAIGH 3,171,497
LAWN EDGE CUTTER
Filed Sept. 27, 1963 3 Sheets-Sheet 3

INVENTOR
ARTHUR WILLIAM HAIGH
By Linton and Linton
ATTORNEYS

United States Patent Office 3,171,497
Patented Mar. 2, 1965

3,171,497
LAWN EDGE CUTTER
Arthur William Haigh, 7 Auckland St., North Perth,
Western Australia, Australia
Filed Sept. 27, 1963, Ser. No. 312,073
2 Claims. (Cl. 172—15)

This invention relates to an improved lawn edge cutter.

The object of the invention is to provide a lawn edge cutter in which the depths to which the blades cut can be readily adjusted and which is relatively simple and economical in construction.

In one form the invention resides in a lawn edge cutter comprising a wheeled base, a motor mounted on said wheeled base with its drive shaft extending laterally from said base, a spigot fixedly mounted on said base and positioned around the drive shaft of said motor but spaced therefrom, a carrier arm having one end pivotally mounted on said spigot concentric with said drive shaft for rotation about substantially the same axis as said drive shaft, a cutter shaft rotatably mounted on the other end of said carrier arm parallel to said drive shaft, a cutter assembly mounted on said cutter shaft for rotation therewith, drive means including an endless belt connecting said drive shaft and said cutter shaft, and manually operable means for adjusting the position of said carrier arm so as to raise or lower said other end thereof and said cutter assembly.

In another form the invention resides in a lawn edge cutter comprising a wheeled base, a motor mounted on said wheeled base with its drive shaft extending laterally from said base, a carrier arm having one end pivotally mounted on said base concentric with said drive shaft for rotation about substantially the same axis as said drive shaft, a cutter shaft rotatably mounted on the other end of said carrier arm parallel to said drive shaft, a cutter assembly mounted on said cutter shaft for rotation therewith, drive means including an endless belt connecting said drive shaft and said cutter shaft, manually operable means for adjusting the position of said carrier arm so as to raise or lower said other end thereof and said cutter assembly, and a spring-loaded arm one end of which is connected to the carrier arm the other end of which is positioned adjacent the lower run of said endless belt, an idler pulley rotated on said other end of said arm for engaging said lower run of said endless belt and stop means mounted on the base to limit the upward movement of said spring-loaded arm when the said carrier arm is raised to disengage said idler pulley from said lower run of said endless belt.

Preferably the carrier arm is substantially straight and projects obliquely from its pivotal mount.

The invention will be better understood by reference to the following description of one specific embodiment thereof as shown in the accompanying drawings, wherein.

Figure 1:
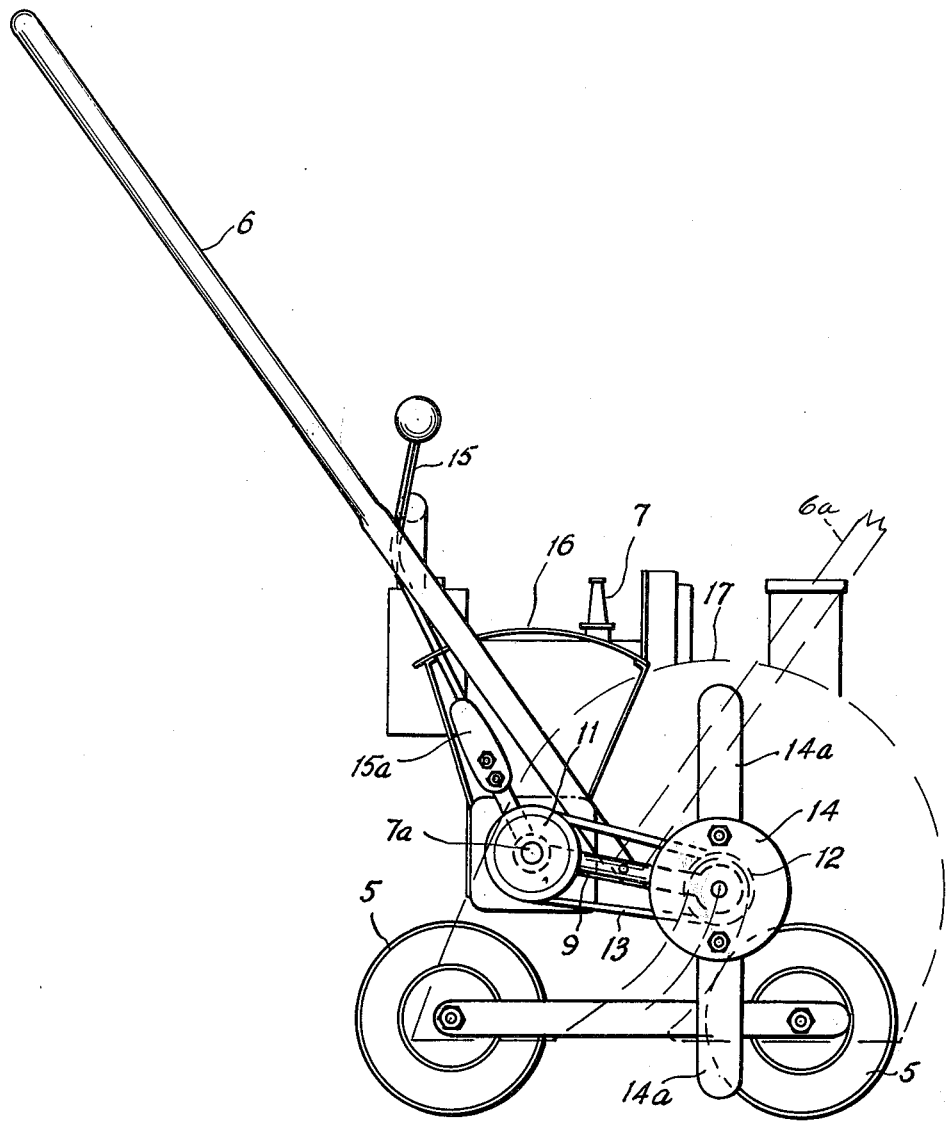
FIG. 1 is a side elevation.
Figure 4:
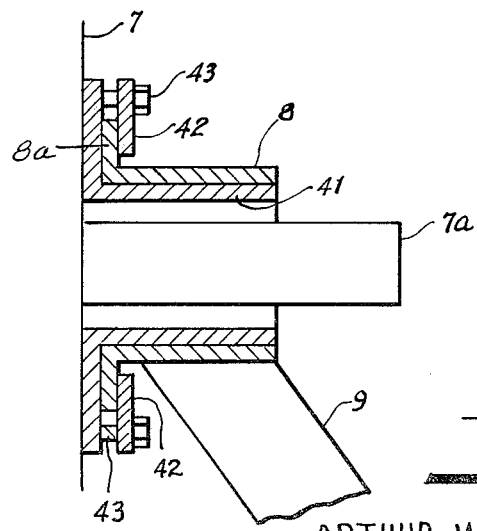
FIG. 4 is a fragmentary section showing the mounting of the inner end of the carrier arm.

As shown in the drawings the base is formed in any suitable manner and is provided with four wheels 5 and a handle 6 so that it can be pushed along the ground. Preferably the handle is pivotally mounted on the base so that it can be rotated through approximately 70° (the broken line marked 6a in FIG. 1 indicates the alternative position), so that instead of turning the machine around it is merely a matter of swinging the handle over to the alternative position to reverse the direction of travel of the machine. A small internal combustion engine 7 is mounted on the base with the drive shaft 7a substantially horizontal and projecting from one side of the base. A hollow spigot 41 (see FIG. 4) is fixed to the side of the motor 7 so that it surrounds but is spaced from the drive shaft 7a. A sleeve 8 is pivotally mounted on the outside of the spigot, the sleeve being fixed to or formed integral with the inner end of a carrier arm 9 so that the arm projects obliquely from the drive shaft. The sleeve 8 is provided with a flange 8a which is positioned under keeper plates 42 held in place by the bolts 43 which are used to bolt the spigot 41 to the motor. The keeper plates 42 prevent the sleeve 8 from moving laterally along the spigot 41 but do not prevent it rotating thereon. The outer end of the arm 9 is fitted with a substantially horizontal cutter shaft 10, the ends of which project on each side of the arm.

A pulley 11 is mounted on the projecting end of the drive shaft 7a and a pulley 12 on the inner end of the cutter shaft 10 and an endless belt 13 mounted on the two pulleys. The pulleys 11 and 12 are slidably positioned on both the cutter shaft 10 and the drive shaft so that their position can be adjusted to maintain the pulleys in substantial alignment. If desired, the carrier arm 9 may be made telescopic so that the length of the arm can be increased or decreased to maintain the correct tension on the endless belt. One other suitable means for adjusting the tension on the belt comprises the use of split pulleys on the drive shaft and/or cutter shaft.

Figure 2:
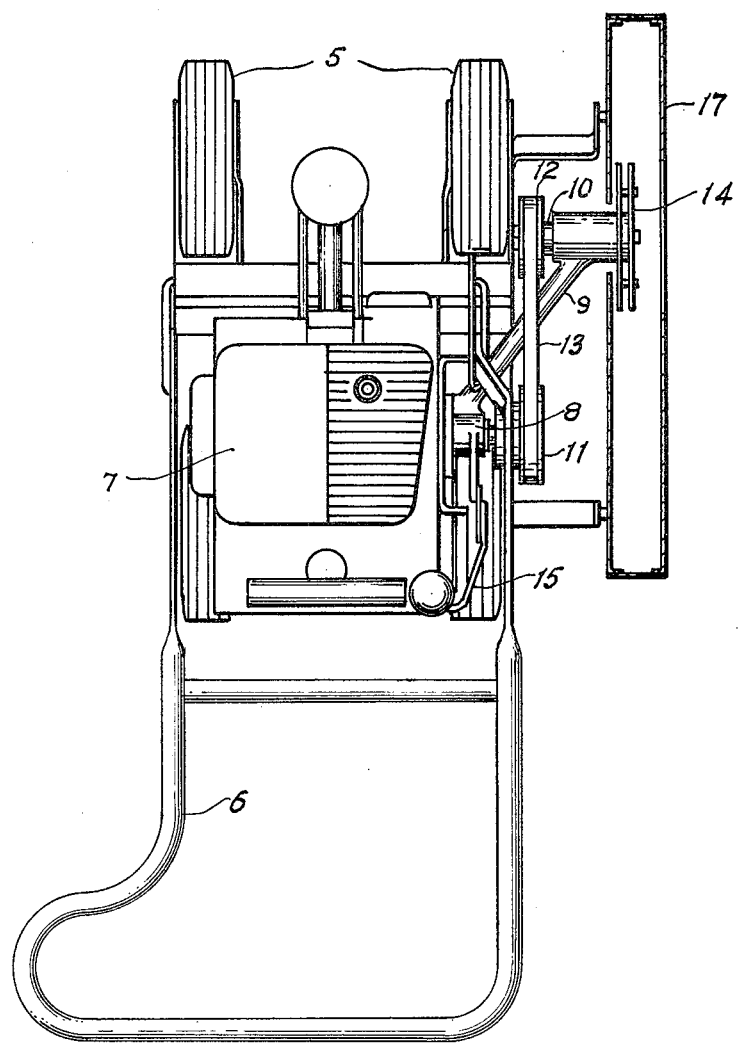
FIG. 2 is a plan view.

A cutter assembly 14 is fixed on the other end of the cutter shaft and comprises a pair of circular plates bolted together with spacers therebetween. The spacers may be roller bearings of the type used in motor cycle chains. One end of a cutter 14a formed of a length of flat steel strip is rotatably mounted on each of the spacers between the plates. One end of an operating rod 15 is fixed to the sleeve 8 carrying the arm 9 so that it projects upwardly therefrom. The rod is spring-loaded by means of a leaf spring 15a incorporated therein so as to bear against the serrated edge of an arcuate plate 16 (not shown in FIG. 2 for the sake of clarity) supported on the casing of the motor. By pushing the operating rod 15 to one side against the spring-loading so that it disengages from the serrations, the sleeve 8 can be rotated about its mounting around the drive shaft to raise or lower the outer end of the carrier arm 9 to the desired position.

If desired, a guard 17 may be fitted to the outer end of the arm so as to enclose the upper portion of the path of the cutter assembly.

Figure 3:
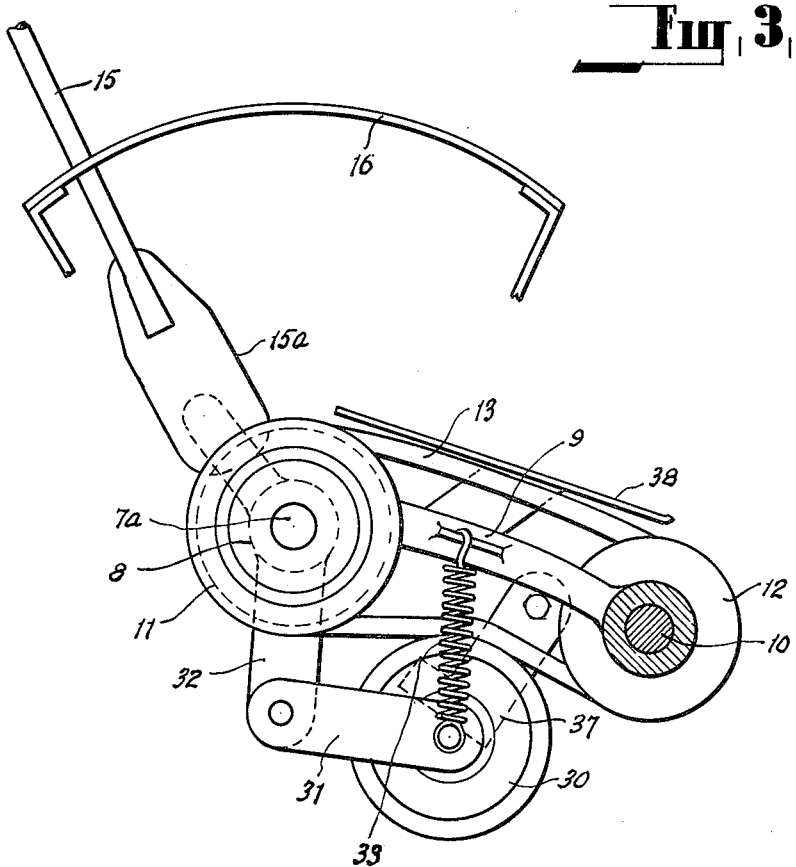
FIG. 3 is a fragmentary side elevation showing clutch means incorporated into the cutter drive with the motor and base omitted for clarity.

If desired, clutch means may be incorporated in the drive mechanism and one suitable form is shown in FIG. 3 of the drawings. An idler pulley 30 is rotatably mounted on the end of an arm 31 the other end of which is pivotally mounted on the free end of an arm 32 fixed to and projecting downwardly from the sleeve 8 on which the carrier arm 9 is mounted. A coiled spring 33 is connected between the outer end of the arm 31 and the carrier arm 9. The pulley 30 is positioned so that it bears against the lower run of the endless belt 13 connecting the pulley 11 mounted on the drive shaft 7a and the pulley 12 mounted on the cutter shaft 10. An adjustable stop 37 is mounted on the body of the motor so that it bears against a projection on the pivot of the pulley 30. When the carrier arm 9 is lowered by means of the operating rod 15, the pulley 30 moves away from the stop 37 and the coiled spring 33 causes the pulley 30 to bear against the lower run of the belt 13 and so tension the belt and so cause the cutter shaft to rotate. When the arm is raised, the projection on the pivot pin of the pulley 30 bears against the stop 37, thereby extending the coiled spring 33 so that the tension exerted by the pulley 30 on the lower run of the endless belt 34 is reduced to such an extent that the pulleys slip on the belt and the cutter shaft is thereby disengaged from the motor. A keeper 38 is positioned above the upper run of the belt to prevent the belt jumping off the pulleys when in the idling position.

I claim:

1. A lawn edge cutter comprising a wheeled base, a motor mounted on said wheeled base with its drive shaft extending laterally from said base, a spigot fixedly mounted on said base and positioned around the drive shaft of said motor but spaced therefrom, a carrier arm having one end pivotally mounted on said spigot concentric with said drive shaft for rotation about substantially the same axis as said drive shaft, a cutter shaft rotatably mounted on the other end of said carrier arm parallel to said drive shaft, a cutter assembly mounted on said cutter shaft for rotation therewith, drive means including an endless belt connecting said drive shaft and said cutter shaft, and manually operable means for adjusting the position of said carrier arm so as to raise or lower said other end thereof and said cutter assembly.

2. A lawn edge cutter comprising a wheeled base, a motor mounted on said wheeled base with its drive shaft extending laterally from said base, a carrier arm having one end pivotally mounted on said base concentric with said drive shaft for rotation about substantially the same axis as said drive shaft, a cutter shaft rotatably mounted on the other end of said carrier arm parallel to said drive shaft, a cutter assembly mounted on said cutter shaft for rotation therewith, drive means including an endless belt connecting said drive shaft and said cutter shaft, manually operable means for adjusting the position of said carrier arm so as to raise or lower said other end thereof and said cutter assembly, and a spring-loaded arm one end of which is connected to the carrier arm the other end of which is positioned adjacent the lower run of said endless belt, an idler pulley rotated on said other end of said arm for engaging said lower run of said endless belt and stop means mounted on the base to limit the upward movement of said spring-loaded arm when the said carrier arm is raised to disengage said idler pulley from said lower run of said endless belt.

References Cited by the Examiner
UNITED STATES PATENTS

| | | | |
|---|---|---|---|
| Re. 24,559 | 11/58 | Hutchens | 56—256 |
| 288,341 | 11/83 | Kellogg. | |
| 2,509,993 | 5/50 | Soss | 74—242 X |
| 2,538,230 | 1/51 | Boggs | 172—16 |
| 2,569,308 | 9/51 | Haapala | 56—25.4 X |
| 2,618,919 | 11/52 | Hutchens | 56—25.4 |
| 2,718,742 | 9/55 | Tangeman | 56—25.4 |
| 2,719,400 | 10/55 | Lesesne | 56—256 |
| 2,862,344 | 12/58 | Caudle | 56—256 |
| 3,018,599 | 1/62 | Rambo | 56—256 |
| 3,057,411 | 10/62 | Carlton | 172—120 |

T. GRAHAM CRAVER, *Primary Examiner.*

ABRAHAM G. STONE, *Examiner.*